UNITED STATES PATENT OFFICE.

EDWARD FRANK KERN, OF LANSINGBURG, NEW YORK, ASSIGNOR TO ANSON G. BETTS, OF LANSINGBURG, NEW YORK.

PROCESS OF TREATING ANODE-SLIMES.

No. 803,601.     Specification of Letters Patent.     Patented Nov. 7, 1905.

Application filed March 27, 1905. Serial No. 252,338.

*To all whom it may concern:*

Be it known that I, EDWARD FRANK KERN, a citizen of the United States, residing at Lansingburg, county of Rensselaer, and State of New York, have invented certain new and useful Improvements in Treating Anode-Slimes, of which the following is a specification.

My invention has for its object the economical treatment of anode-slime, particularly of lower-grade slime from the treatment by electrolysis of lead alloys containing a large quantity of antimony or arsenic.

I oxidize the slime by a gentle roast, driving off most of the arsenic as arsenious acid and converting the antimony into trioxid, so that it can be subsequently dissolved from the product with a suitable solvent, preferably hydrofluoric acid. I have discovered that moistening the slime with diluted or concentrated sulfuric acid facilitates the roasting and prevents sintering of the slime. A temperature below a red heat is preferred, as if the temperature reaches a red heat the antimony goes into tetra and pent oxid, which is not easily soluble. The operation is most easily carried out by spreading the charge on an iron plate heated from underneath.

My process is also applicable to the treatment of copper anode-slime containing much copper sulfid converted by roasting into copper oxid and sulfate.

Before extracting the antimony from the product I prefer to treat it with an acid solution of ferric sulfate or other oxidizing acid solution to complete the oxidation of antimony, arsenic, &c., and to remove any copper. After extracting the antimony the slime is ready for fire treatment.

Silver may be extracted with the copper, if desired, or left to be recovered by fire processes, in whole or in part.

What I claim as new, and desire to secure by Letters Patent, is—

1. The process of treating anode-slime consisting in oxidizing metallic arsenic and antimony by heating with access of air, volatilizing arsenic as arsenious acid, and converting antimony into oxid, and extracting antimony from the resulting product with a suitable solvent.

2. The process of treating anode-slime consisting in oxidizing metallic arsenic and antimony, volatilizing arsenic as arsenious acid, and converting antimony to oxid, extracting copper from the product with an acid, and extracting antimony from the residue with a suitable solvent.

3. The process of treating anode-slime consisting in mixing it with sulfuric acid, roasting with air access, extracting copper from the product with a solution containing sulfuric acid, and extracting antimony from the residue with a suitable solvent.

In testimony whereof I have hereunto set my hand this 25th day of March, 1905.

EDWARD FRANK KERN.

Witnesses:
    FREDERICK CLARK,
    W. B. BARNHISEL.